United States Patent
Katayama et al.

(10) Patent No.: US 9,500,269 B2
(45) Date of Patent: Nov. 22, 2016

(54) CAM FOLLOWER FOR ROCKER ARM AND CAM FOLLOWER DEVICE

(71) Applicant: NTN CORPORATION, Osaka (JP)

(72) Inventors: Akihiko Katayama, Iwata (JP); Katsufumi Abe, Iwata (JP); Hisataka Hasegawa, Iwata (JP); Masaru Kuroda, Iwata (JP)

(73) Assignee: NTN CORPORATION, Osaka (JP)

( * ) Notice: Subject to any disclaimer, the term of this patent is extended or adjusted under 35 U.S.C. 154(b) by 18 days.

(21) Appl. No.: 14/576,508

(22) Filed: Dec. 19, 2014

(65) Prior Publication Data

US 2015/0101449 A1 Apr. 16, 2015

Related U.S. Application Data

(63) Continuation of application No. 13/057,826, filed as application No. PCT/JP2009/063115 on Jul. 22, 2009, now abandoned.

(30) Foreign Application Priority Data

Aug. 21, 2008 (JP) .................. 2008-212466

(51) Int. Cl.
| | | |
|---|---|---|
| *F01L 1/18* | (2006.01) | |
| *F16H 53/06* | (2006.01) | |
| *F01L 1/053* | (2006.01) | |
| *F16C 13/00* | (2006.01) | |
| *F16C 21/00* | (2006.01) | |

(Continued)

(52) U.S. Cl.
CPC .............. *F16H 53/06* (2013.01); *F01L 1/053* (2013.01); *F01L 1/181* (2013.01); *F16C 13/006* (2013.01); *F16C 21/00* (2013.01); *F16C 33/6659* (2013.01); *F16H 57/04* (2013.01); *Y10T 74/2107* (2015.01)

(58) Field of Classification Search
CPC ........ F16H 53/06; F16H 57/04; F01L 1/053; F01L 1/181; F16C 13/006
USPC ......... 123/90.39, 90.44, 90.48, 90.52, 90.55; 74/569
See application file for complete search history.

(56) References Cited

U.S. PATENT DOCUMENTS

| 4,614,171 A | 9/1986 | Malhotra | |
|---|---|---|---|
| 6,199,527 B1 * | 3/2001 | Okubo | B21K 1/205 123/90.39 |

(Continued)

FOREIGN PATENT DOCUMENTS

| JP | 61-39875 | 11/1986 |
|---|---|---|
| JP | 6025606 | 7/1994 |

(Continued)

*Primary Examiner* — Ching Chang
(74) *Attorney, Agent, or Firm* — Clark & Brody

(57) ABSTRACT

A cam follower for a rocker arm includes a cylindrical outer ring (11) having an outer circumference surface abutting on a cam, a support shaft (6) to support the outer ring (11), a plurality of rollers (12) arranged in an annular region between the support shaft (6) and the outer ring (11), and a side plate (16) composed of a ring-shaped disk penetrated by the support shaft (6), opposed to an end face (15) of the roller (12), and having an outer diameter Ds smaller than an inner diameter Dr of the outer ring (11). The side plate (16) is arranged at each end of the roller (12), and a relationship Lr<Lk+2t is satisfied in which Lk represents a shaft length of the roller (12), Lr represents a shaft length of the outer ring (11), and t represents a thickness of the side plate (16).

5 Claims, 3 Drawing Sheets

(51) Int. Cl.
*F16C 33/66* (2006.01)
*F16H 57/04* (2010.01)

(56) References Cited

U.S. PATENT DOCUMENTS

2004/0216711 A1 11/2004 Okubo et al.
2004/0247216 A1 12/2004 Ichikawa et al.
2008/0107369 A1 5/2008 Fujita et al.

FOREIGN PATENT DOCUMENTS

| JP | 2508561 | 6/1996 |
| JP | 2508562 | 6/1996 |
| JP | 2527161 | 2/1997 |
| JP | 2590701 | 2/1999 |
| JP | 2002-235753 | 8/2002 |
| JP | 2004-308857 | 11/2004 |
| JP | 2006-63860 | 3/2006 |
| WO | 2008/050671 | 5/2008 |

* cited by examiner

CAM FOLLOWER FOR ROCKER ARM AND CAM FOLLOWER DEVICE

This application is a continuation of application Ser. No. 13/057,826, which was filed on Feb. 7, 2011, which is a national phase of PCT/JP2009/063115, filed on Jul. 22, 2009.

TECHNICAL FIELD

The present invention relates to a cam follower for a rocker arm used in a movable valve mechanism of an internal-combustion engine.

BACKGROUND OF THE INVENTION

A rocker arm for an engine sways in response to a rotation motion of a cam, and opens and closes an intake valve and an exhaust valve. In order to reduce a friction loss during the above operation, the following technique is conventionally well known, that is, while an outer ring provided between a pair of leg parts of the rocker arm is rotatably supported by a cageless type roller bearing, the rocker arm and the cam are in rolling contact with each other.

While the cageless type roller bearing can be used under a high-load condition, an outer ring end face and a roller end face come into contact with a leg part of the rocker arm and could bite it. Especially, when the rocker arm is made of light metal, the rocker arm is excessively abraded. In addition, the roller bearing is damaged by metal powder generated due to the abrasion.

Thus, with a view to eliminating the abrasion of the rocker arm, well-known roller bearings are disclosed in Utility Model Registration No. 2508561 (Patent document 1), Utility Model Registration No. 2508562 (Patent document 2), and Utility Model Publication No. 6-25606 (Patent document 3).

Each of the roller bearings disclosed in the patent documents 1 to 3 is provided to prevent the rocker arm from being abraded in such a manner that a plate is arranged between the rocker arm and a roller end face.

BACKGROUND ART DOCUMENT

Patent Document

Patent document 1=Japanese Utility Model Registration No. 2508561
Patent document 2 Japanese Utility Model Registration No. 2508562
Patent document 3 Japanese Utility Model Publication No. 6-25606

SUMMARY OF THE INVENTION

Problems to be Solved by the Invention

However, the following problems are still generated in the above conventional outer ring. That is, when the plate comes into contact with an end face of the outer ring, the plate adheres to the outer ring without any space due to viscosity of lubricant oil, so that the lubricant oil cannot be smoothly supplied into the roller bearing and accordingly, a life of the roller bearing is shortened.

It is an object of the present invention to provide a cam follower for a rocker arm and a cam follower device in which lubricant oil can be smoothly supplied into a bearing, in view of the above-described circumstances.

Means for Solving the Problems

A cam follower for a rocker arm according to the present invention to attain the object includes a cylindrical outer ring having an outer circumference surface abutting on a cam, a support shaft to support the outer ring, a plurality of rollers arranged in an annular region between the support shaft and the outer ring, and a side plate composed of a ring-shaped disk penetrated by the support shaft, opposed to an end face of the roller, and having an outer diameter smaller than an inner diameter of the outer ring. Thus, the side plate is arranged at each end of the roller, and a relationship $Lr<Lk+2t$ is satisfied in which Lk represents a shaft length of the roller, Lr represents a shaft length of the outer ring, and t represents a thickness of the side plate.

According to the present invention, since the side plate is provided so as to be composed of the ring-shaped disk penetrated by the support shaft, opposed to the end face of the roller, and have the outer diameter smaller than the inner diameter of the outer ring, the rocker arm can be prevented from being abraded due to the bite of the roller end face. In addition, a radially open annular space can be ensured between the outer diameter of the side plate and the inner diameter of the outer ring, so that the lubricant oil can be poured from this annular space. Thus, the side plate can ensure an axially open space between the outer ring and the rocker arm, so that the lubricant oil can be efficiently poured from this space.

Although the present invention is not limited to the first embodiment, as a preferably embodiment, a relationship $PCD<Ds$ is satisfied in which PCD represents a pitch circle diameter of the roller, and Ds represents the outer diameter of the side plate. Thus, the roller end face can be surely prevented from biting.

Preferably, the shaft length Lk of the roller and the shaft length Lr of the outer ring further satisfy $Lk<Lr$, so that a contact length between an outer ring inner circumference surface and the roller can be large and a bearing load of the outer ring can be sufficiently ensured.

Preferably, the side plate has surface hardness of Hv 550 or more in terms of the Vickers hardness. Thus, the side plate can be prevented from being abraded when the side plate comes into contact with the roller.

Preferably, the side plate has surface roughness of 0.8 µm or less in terms of the arithmetic average roughness Ra. Thus, the rocker arm can be prevented from being abraded when the side plate comes into contact with the rocker arm made of light metal.

Preferably, each of the outer ring, the support shaft, the roller has a nitrogen enrichment layer, and an austenite grain of the nitrogen enrichment layer of at least one member of the support shaft and the roller is miniaturized so as to have the grain size number 10 or more, a residual austenite amount of the nitrogen enrichment layer of the member ranges from 11% by volume to 25% by volume, and a nitrogen content of the nitrogen enrichment layer of the member ranges from 0.1% by mass to 0.7% by mass. Thus, the cam follower can increase its life expectancy.

Preferably, a crowning part is provided in at least one of a rolling surface of the roller and the inner circumference surface of the outer ring serving as the rolling surface of the roller. Thus, when the outer ring leans to one radial side, and the other end of the roller projects from the inner circumference surface of the outer ring to the other direction, damage caused by an action of an edge load can be prevented.

In addition, a cam follower device according to the present invention includes a sway member having a pair of leg parts, a support shaft extending across the pair of leg parts, a cylindrical outer ring rotatably supported by the support shaft and having an outer circumference surface, an inner circumference surface, and an end face, in which the outer circumference surface abuts on a cam, a plurality of rollers arranged in an annular region between the support shaft and the outer ring, and a side plate composed of a ring-shaped disk penetrated by the support shaft, having an outer diameter smaller than an inner diameter of the outer ring, and arranged between an end face of the roller and the leg part. Thus, the side plate is arranged at each end of the roller, and a relationship $Lr<Lk+2t$ is satisfied in which Lk represents a shaft length of the roller, Lr represents a shaft length of the outer ring, and t represents a thickness of the side plate.

According to the present invention, the side plate is provided so as to be composed of the ring-shaped disk penetrated by the support shaft, opposed to the end face of the roller, and have the outer diameter smaller than the inner diameter of the outer ring, the rocker arm can be prevented from being abraded due to the bite of the roller end face. In addition, the radially open annular space can be ensured between the outer diameter of the side plate and the inner diameter of the outer ring, so that the lubricant oil can be poured from this annular space. Thus, the side plate can ensure the axially open space between the outer ring and the rocker arm, so that the lubricant oil can be efficiently poured from this space.

Effect of the Invention

According to the present invention, the side plate is provided so as to be composed of the ring-shaped disk penetrated by the support shaft, opposed to the end face of the roller, and have the outer diameter smaller than the inner diameter of the outer ring, the rocker arm can be prevented from being abraded due to the bite of the roller end face, and the radially open annular space can be ensured between the outer diameter of the side plate and the inner diameter of the outer ring, so that the lubricant oil can be poured from this annular space. Thus, since the roller shaft length Lk, the outer ring shaft length Lr, and the side plate thickness t satisfy that $Lr<Lk+2t$, the side plate can ensure the axially open spade between the outer ring and the rocker arm, so that the lubricant oil can be efficiently poured from this space. Therefore, the bearing life of the cam follower can be improved. In addition, bearing torque of the cam follower can be reduced, so that operation efficiency of the internal combustion engine can be improved.

DESCRIPTION OF THE PREFERRED EMBODIMENTS

Figure 1:
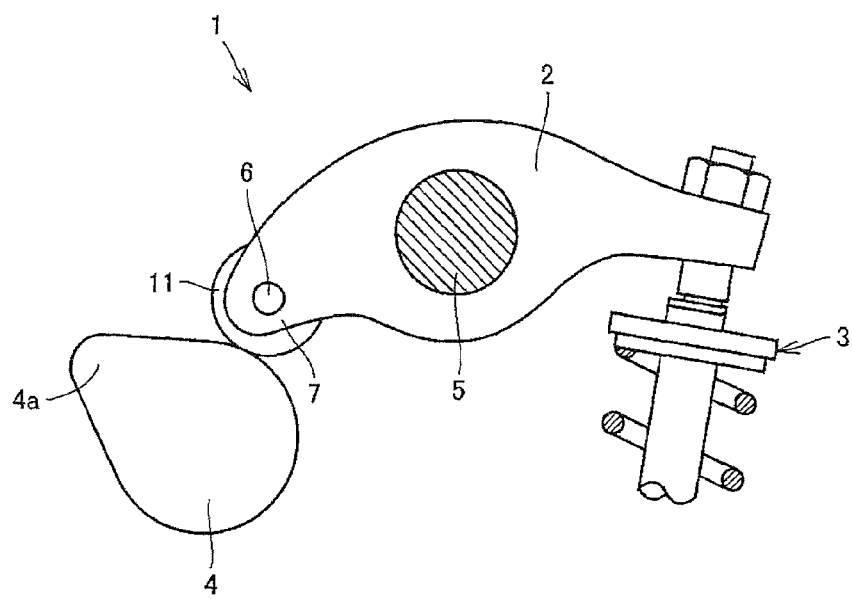
FIG. 1 is a front view showing a movable valve mechanism incorporating a cam follower according to a working example of the present invention.

Hereinafter, an embodiment of the present invention will be described based on working examples shown in the drawings.

FIG. 1 is a front view showing a movable valve mechanism incorporating a cam follower according to a first working example of the present invention. A movable valve mechanism 1 is an engine component of a car and includes a rocker arm 2 which is swingably supported by a shaft 5, a valve 3 arranged at one end of the rocker arm 2, to perform intake and exhaust of an engine combustion chamber by the swing of the rocker arm 2, a support shaft 6 arranged at the other end of the rocker arm 2, an outer ring 11 rotatably and axially supported by an outer circumference of the support shaft 6, and a cam 4 fixed to a camshaft (not shown) and having an eccentric part 4a.

The above movable valve mechanism 1 is organized such that a rotation of a crankshaft (not shown) of an engine is transmitted to the camshaft (not shown) through a timing belt (not shown) to rotate the cam 4. Thus, when the eccentric part 4a of the cam 4 abuts on an outer circumference surface of the outer ring 11, the rocker arm 2 swings around the shaft 5 and pushes the valve 3 downward. Thus, intake and exhaust are performed in the engine. At this time, since the outer ring 11 rotates due to the rotation of the cam 4, a friction loss of an abutment part between the outer ring 11 and the cam 4 can be cut. The rocker arm 2 is made of light metal including a leg part 7 projecting from its end, so that the movable valve mechanism 1 can be light in weight and improved in fuel consumption rate.

Figure 2:
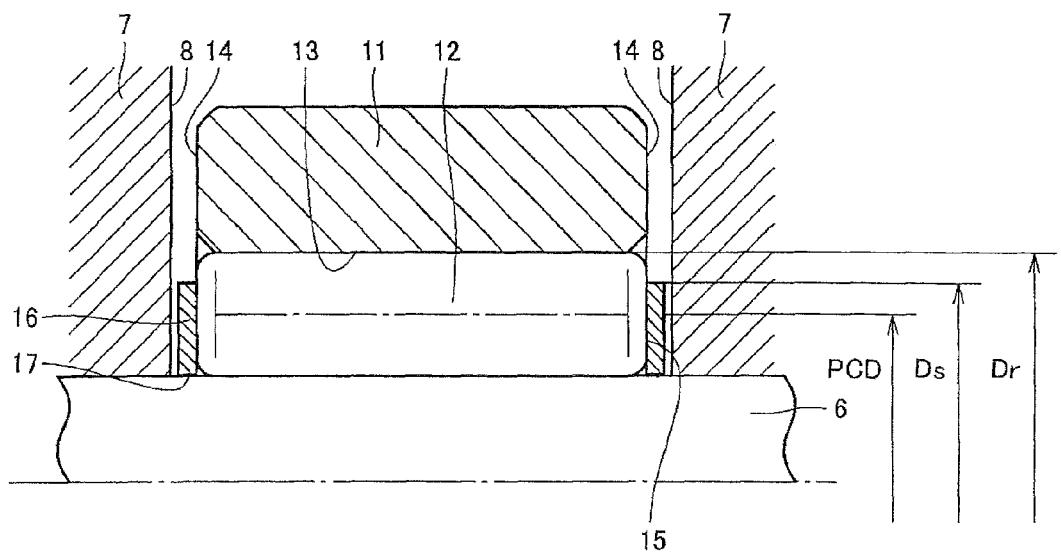
FIG. 2 is a cross-sectional view showing a first working example of the present invention.

FIG. 2 is an enlarged cross-sectional view of the cam follower which axially supports the outer ring 11. The support shaft 6 extends across a pair of leg parts 7 which projects from the end of the rocker arm 2 so as to be opposed to each other. The hollow cylindrical outer ring 11, and a roller 12 provided between the support shaft 6 serving as its inner ring and the outer ring 11 serving as its outer ring are arranged between flat wall surfaces 8 and 8 of the parallel leg parts 7 and 7. The plurality of rollers 12 are arranged in an annular region provided between an inner circumference surface 13 of the hollow cylindrical outer ring 11, and an outer circumference surface of the support shaft 6, and roll on these inner and outer circumference surfaces. The outer ring 11 has an end face 14 in addition to the outer circumference surface and the inner circumference surface 13.

A shaft length of the outer ring 11 between the end faces 14 and 14 may be the same as a shaft length of the roller 12 between both end surfaces 15 and 15, or may be different from that as will be described below in a second working example.

A side plate 16 is arranged between the leg part 7 and the end face 15 of the roller 12. The side plate 16 is a flat ring-shaped disk having a center hole 17, and the support shaft 6 penetrates the center hole 17. The side plate 16 is opposed to the wall surface 8 of the leg part 7 and opposed to the roller end face 15 to prevent the roller from coming into contact with the leg part 7. Thus, the leg part 7 made of light metal can be prevented from being abraded.

As shown in FIG. 2, an outer diameter Ds of the side plate 16 is smaller than an inner diameter Dr of the outer ring 11. Therefore, an annular space is provided between the outer diameter of the side plate 16 and the inner circumference surface 13 of the outer ring 11.

Preferably, the outer diameter Ds of the side plate 16 is larger than a pitch circle diameter PCD. Thus, there is a large difference between the inner and outer diameters of the side plate 16, so that it is easy to be shaped. Thus, the roller end face 15 is surely prevented from biting the wall surface 8.

According to this working example, since the cam follower of the movable valve mechanism 1 is provided with the side plate 16 opposed to the end face 15 of the roller 12 and having the outer diameter Ds smaller than the inner diameter Dr of the outer ring 11, the annular space is surely provided between the side plate 16 and the outer ring 11, so that lubricant oil can be poured from the outside to this annular space. Therefore, the roller 12, the inner circumference surface 13, and the outer circumference surface of the support shaft 6 can be smoothly lubricated, so that a bearing life of the cam follower is improved.

Preferably, a surface hardness of the side plate 16 is Hv 550 or more in terms of the Vickers hardness. In this case, the side plate 16 can be prevented from being abraded when the side plate 16 and the roller 12 come into contact with each other.

In addition, preferably, a surface roughness of the side plate 16 is 0.8 μm or less in terms of the arithmetic average roughness Ra. In this case, the leg part 7 is prevented from being abraded when the leg part 7 of the rocker arm 2 made of light metal and the side plate 16 come into contact with each other.

Preferably, each of the outer ring 11, the support shaft 6, and the roller 12 has a nitrogen enrichment layer, and an austenite grain of the nitrogen enrichment layer of at least one member of the support shaft 6 and the roller 12 is miniaturized so as to have the grain size number 10 or more, a residual austenite amount of the nitrogen enrichment layer of that member is 11% by volume to 25% by volume, and a nitrogen content of the nitrogen enrichment layer of that member is 0.1% by mass to 0.7% by mass.

A comparison test was conducted on the cam follower according to this working example, and a conventional cam follower, with the use of an outer ring rotation type of life testing machine. A test condition was set as follows; that is, the cam follower was set so that the outer ring serving as a test object came into contact with a rotating drive roll while being subjected to external force, and the outer ring was rotated 7000 times per minute while being subjected to external force of 3000 [N], and being lubricated with engine oil at 100° C. with an amount of 20 [ml] per minute.

Figure 5:
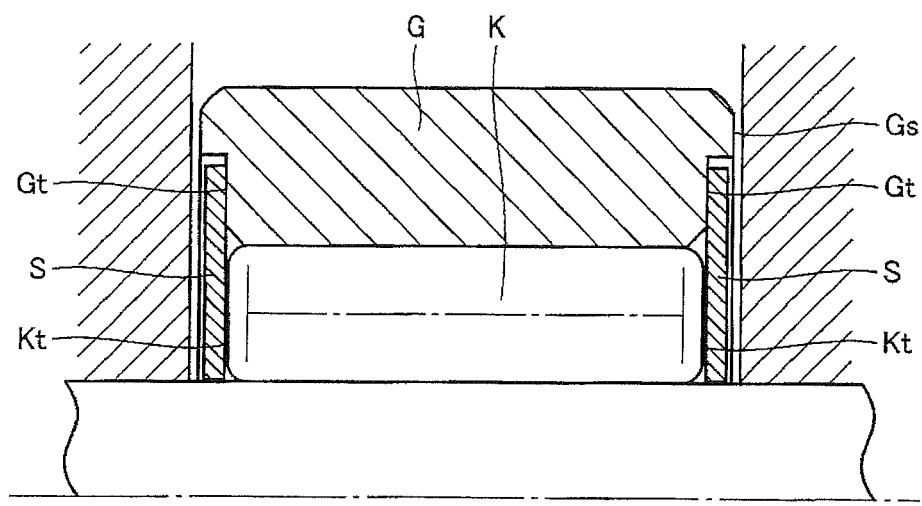
FIG. 5 is a cross-sectional view showing a conventional comparison product.

As shown in a cross-sectional view in FIG. 5, a shape of a comparison product 1 serving as a conventional example is provided such that an end face Gt of an outer ring G on the inner diameter side is recessed with respect to an end face Gs thereof on the outer diameter side, an end face Kt of a roller K and the side end face Gt on the inner diameter side are both flat, and a shaft length between the roller both end faces Kt and Kt is equal to a shaft length between both end faces Gt and Gt on the outer ring inner diameter side. An outer diameter of a side plate S is larger than an inner diameter of the outer ring G, and the side plate S is in contact with the end face Gt on the outer ring inner diameter side and the roller end face Kt when the roller 12 does not lean to one axial side. In addition, a shape of a comparison product 2 is all the same as that of the inventive product shown in FIG. 2.

As for the comparison product 1 and the comparison product 2, as shown in Table 1, their outer rings, rollers, and support shafts were each subjected to a standard heat treatment. More specifically, the standard heat treatment was performed such that after being heated to a temperature of 840° C. in a RX gas atmosphere for a retention time of 20 minutes, the object was quenched, and then tempered at 180° C. for 90 minutes.

As for the inventive product, as shown in Table 1, the outer ring was subjected to a carbonitriding heat treatment, and the roller and the support shaft were subjected to the following heat treatment. That is, carbonitriding+secondary heat treatment at low temperature were performed such that after being heated to a carbonitriding treatment temperature of 850° C. in a RX-ammonia mixed gas atmosphere for a retention time of 150 minutes, the object was primarily quenched from 850° C., and after being heated to 800° C. lower than the carbonitriding treatment temperature for 20 minutes, it was secondarily quenched, and then tempered at 180° C. for 90 minutes.

In addition, the outer ring of the inventive product was subjected to the carbonitriding heat treatment such that after being heated to a temperature of 850° C. in a RX-ammonia mixed gas atmosphere for 150 minutes, it was quenched from 850° C., and then tempered at 180° C. for 90 minutes.

TABLE 1

| TEST OBJECT | COMPARISON PRODUCT 1 | COMPARISON PRODUCT 2 | INVENTIVE PRODUCT |
| --- | --- | --- | --- |
| OUTER RING | STANDARD HEAT TREATMENT | STANDARD HEAT TREATMENT | CARBONITRIDING |
| ROLLER | STANDARD HEAT TREATMENT | STANDARD HEAT TREATMENT | CARBONITRIDING + SECONDARY TREATMENT AT LOW |
| SUPPORT SHAFT | STANDARD HEAT TREATMENT | STANDARD HEAT TREATMENT | CARBONITRIDING + SECONDARY TREATMENT AT LOW |
| LIFE RATE | 1 | 1.3 | 4.7 |

Table 2 shows compositions provided by the standard heat treatment, the carbonitriding heat treatment, and the carbonitriding+secondary treatment at low temperature. By the carbonitriding+secondary treatment at low temperature, the austenite grain size number (JIS G0551) is 12 which exceeds the grain size number 10. In addition, a residual austenite amount (%) is 21% by volume which is within the range of 11% by volume to 25% by volume. Furthermore, a nitrogen content (%) is 0.30% by mass which is within the range of 0.1% by mass to 0.7% by mass.

TABLE 2

| HEAT TREATMENT OF TEST OBJECT | AUSTENITE GRAIN SIZE NUMBER (JIS G0551) | RESIDUAL AUSTENITE AMOUNT (% BY VOLUME) | NITROGEN CONTENT (% BY MASS) |
| --- | --- | --- | --- |
| STANDARD HEAT TREATMENT | 9 | 7 | 0 |
| CARBONITRIDING | 8 | 29 | 0.31 |
| CARBONITRIDING + SECONDARY TREATMENT AT LOW | 12 | 21 | 0.30 |

As shown in Table 1, the result of the comparison test shows that a life rate of the comparison product 2 is 1.3 and a life rate of the inventive product is 4.7 assuming that a life rate of the comparison product 1 is 1.

The reason why the life of the comparison product 2 is longer than that of the comparison product 1 is believed that the comparison product 2 is provided with the side plate 16 which is the ring-shaped disk whose center hole 17 is penetrated by the support shaft 6, opposed to the end face 15 of the roller 12, and has the outer diameter Ds smaller than the inner diameter Dr of the outer ring 11, so that the lubricant oil can be poured from the outside to the roller 12, and a lubrication performance is improved.

As can be seen from this test result, according to this working example in which the cam follower is formed of the nitrogen enrichment layer having the above-described composition, the life rate of the inventive product is 4.7, so that an excellent durability performance is implemented. It is believed that its reason is because the lubricant oil is poured from the outside to the roller 12, and because of the carbonitriding+secondary treatment at low temperature.

Figure 3:
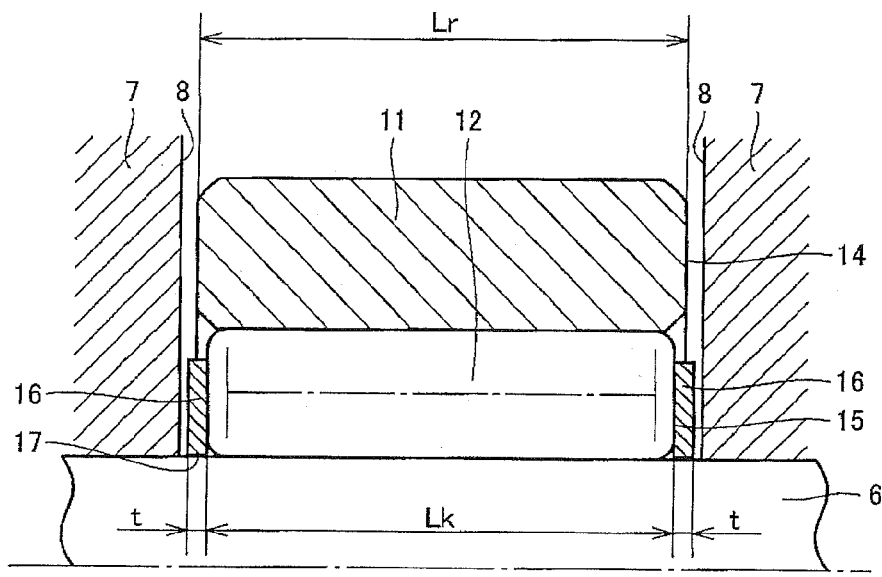
FIG. 3 is a cross-sectional view showing a second working example of the present invention.

Next, a description will be made of a cam follower according to a second working example of the present invention. FIG. 3 is an enlarged vertical cross-sectional view showing the cam follower according to the second working example. Since basic configuration and operation in this working example are in common with the working example shown in FIGS. 1 and 2, the common reference number is assigned to the same component and a description thereof is omitted, and a different configuration will be described.

As shown in FIG. 3, a side plate 16 is arranged between each end of a roller 12 and a wall surface 8, and the end part of the roller 12 is not in contact with the wall surface 8. Furthermore, a relationship Lr<Lk+2t is satisfied wherein Lk represents a shaft length of the roller 12, Lr represents a shaft length of an outer ring 11, and t represents a thickness of the side plate 16. Thus, the outer ring shaft length Lr is shorter than a sum of the roller shaft length Lk and the thicknesses 2t of the two side plates, between the pair of adjacent wall surfaces 8 and 8, so that an axially open space is ensured between the wall surface 8 and an outer ring end face 14. Therefore, lubricant oil can be efficiently poured from the outside into the inner diameter side of the outer ring 11 through this axial space. Therefore, the roller 12, an inner circumference surface 13, and an outer circumference surface of a support shaft 6 can be further smoothly lubricated, so that a bearing life of the cam follower can be further improved.

Preferably, Lk<Lr is satisfied. In this case, the outer ring shaft length Lr is longer than the roller shaft length Lk, so that a contact length between the outer ring inner circumference surface 13 and the roller 12 increases, and a bearing load of the outer ring 11 can be sufficiently ensured.

Figure 4:
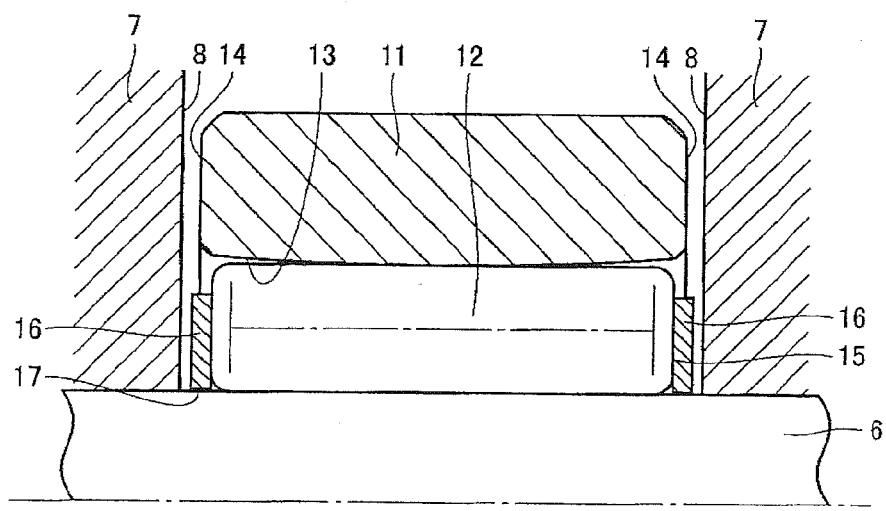
FIG. 4 is a cross-sectional view showing a third working example of the present invention.

Next, a description will be made of a cam follower according to a third working example. FIG. 4 is an enlarged vertical cross-sectional view showing the cam follower according to the third working example. Since basic configuration and operation in this working example are in common with the working examples shown in FIGS. 1 and 3, the common reference number is assigned to the same component and a description thereof is omitted, and a different configuration will be described.

According to this working example, an inner circumference surface 13 of an outer ring 11 serving as a rolling surface of a roller 12 has a crowning part. That is, the axial center of the inner circumference surface 13 projects toward the inner diameter side, and an inner diameter gradually increases toward an end.

According to this working example, since a shaft length of the outer ring 11 between both end surfaces 14 and 14 is longer than a shaft length of the roller 12 between both end faces 15 and 15, a bearing load does not act on the axial end part of the inner circumference surface 13. Especially, since a rolling surface of the roller 12 sometimes projects in an axial direction with respect to the inner circumference surface 13 of the outer ring 11, an undesired edge load such as a bending stress acts on an axial end part of the projecting roller 12 in some cases.

According to this working example, since the crowning part is provided, the stress is prevented from concentrating on the outer ring 11 and the axial end part of the roller 12 even when the outer ring 11 leans to one axial side and the other end of the roller 12 projects from the inner circumference surface of the outer ring to the other side. Therefore, the edge load does not act between the parts 11 and 12, so that the outer ring 11 or the roller 12 can be prevented from being damaged.

In addition, although not shown in the drawing, the rolling surface of the roller 12 may have a crowning part instead of the inner circumference surface 13 of the outer ring 11, or each of the roller 12 and the inner circumference surface 13 may have the crowning part. Other than this working example in which the shaft length of the outer ring 11 is longer than the shaft length of the roller 12, the parts 11 and 12 may have the same shaft length.

While the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention is advantageously applied to a cam follower for a rocker arm employed in a movable valve mechanism of an engine.

EXPLANATION OF REFERENCES

1 MOVABLE VALVE MECHANISM, 2 ROCKER ARM, 3 VALVE, 4 CAM, 4A ECCENTRIC PART, 5 SHAFT, 6 SUPPORT SHAFT, 7 LEG PART, 8 WALL SURFACE, 11 OUTER RING, 12 ROLLER, 13 OUTER RING INNER CIRCUMFERENCE SURFACE, 14 OUTER RING END FACE, 15 ROLLER END FACE, 16 SIDE PLATE, 17 CENTER HOLE

The invention claimed is:

1. A method for lubricating a cam follower of a rocker arm comprising the steps of:
   a) providing a cam follower for a rocker arm, the cam follower further comprising:
   a cylindrical outer ring having an outer circumference surface abutting on a cam;
   a support shaft to support said cylindrical outer ring;
   a plurality of rollers arranged in an annular region between said support shaft and said cylindrical outer ring; and
   a pair of side plates, each side plate composed of a ring-shaped disk penetrated by said support shaft and opposed to an end face of each of said plurality of rollers, wherein said side plate has a surface hardness of Hv 550 or more and surface roughness of 0.8 micrometers or less in terms of an arithmetic average roughness Ra, and is arranged at each end of each of said plurality of rollers, and a relationship Lk<Lr<Lk+2t is satisfied in which Lk represents a shaft length of each of said plurality of rollers, Lr represents a shaft length of said cylindrical outer ring, and t represents a thickness of said side plate, an outer diameter of said side plate is smaller than an inner diameter of said cylindrical outer ring so that an annular space is formed between said side plate and said cylindrical outer ring, b) supplying lubricant oil to the cam follower, the lubricant oil supplied to the cam follower being poured to said annular space and then being poured from said annular space to said roller for lubrication of the cam follower.

2. The method of claim 1, wherein PCD represents a pitch circle diameter of said roller, and Ds represents the outer diameter of said side plate, and a relationship PCD<Ds is satisfied by said cam follower.

3. The method of claim 1, wherein each of said cylindrical outer ring, said support shaft, said roller is provided with a nitrogen enrichment layer, and an austenite grain of said nitrogen enrichment layer of at least one member of said support shaft and the roller is miniaturized so as to have the grain size number 10 or more, a residual austenite amount of said nitrogen enrichment layer of said member ranges from 11% by volume to 25% by volume, and a nitrogen content of said nitrogen enrichment layer of said member ranges from 0.1% by mass to 0.7% by mass.

4. The method of claim 1, wherein a crowning part is provided in at least one of a rolling surface of said roller and an inner circumference surface of said cylindrical outer ring serving as the rolling surface of said roller.

5. The method of claim 1, wherein the cam follower is provided with a sway member having a pair of leg parts and the support shaft extends across said pair of leg parts.

* * * * *